Oct. 2, 1934.   W. H. WILCOX   1,975,525
MOTOR VEHICLE
Filed Nov. 6, 1931   9 Sheets-Sheet 3
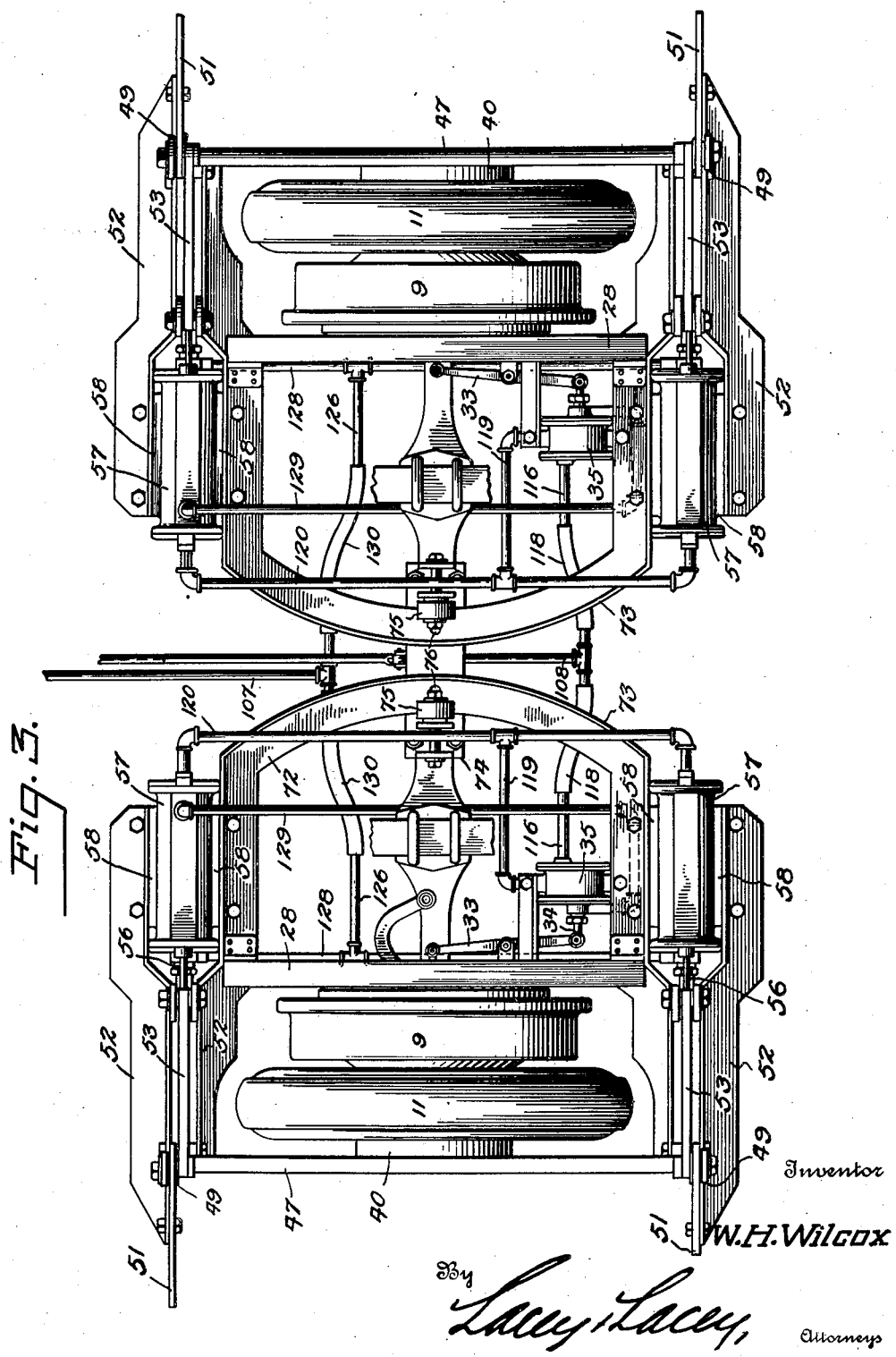

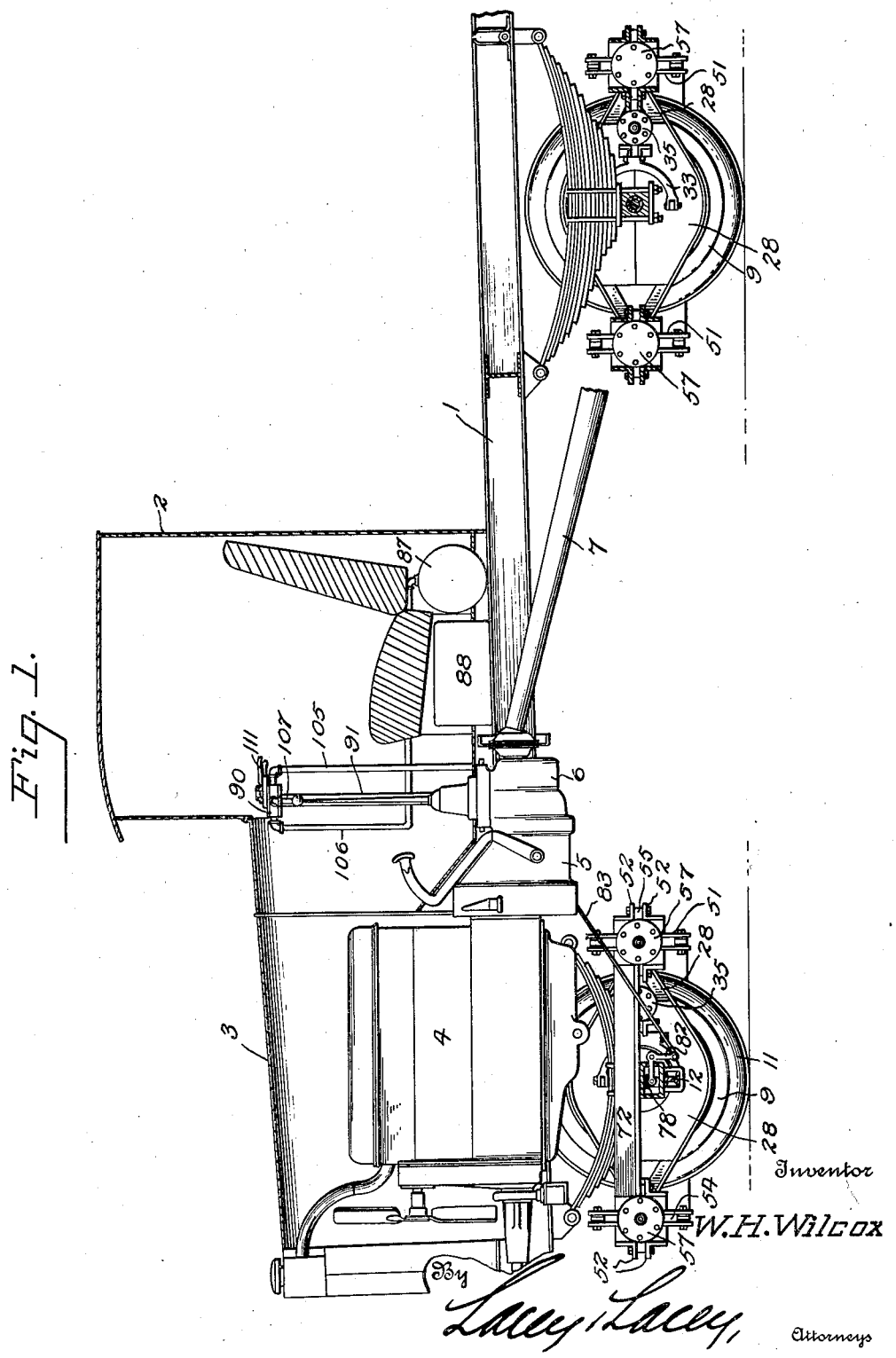

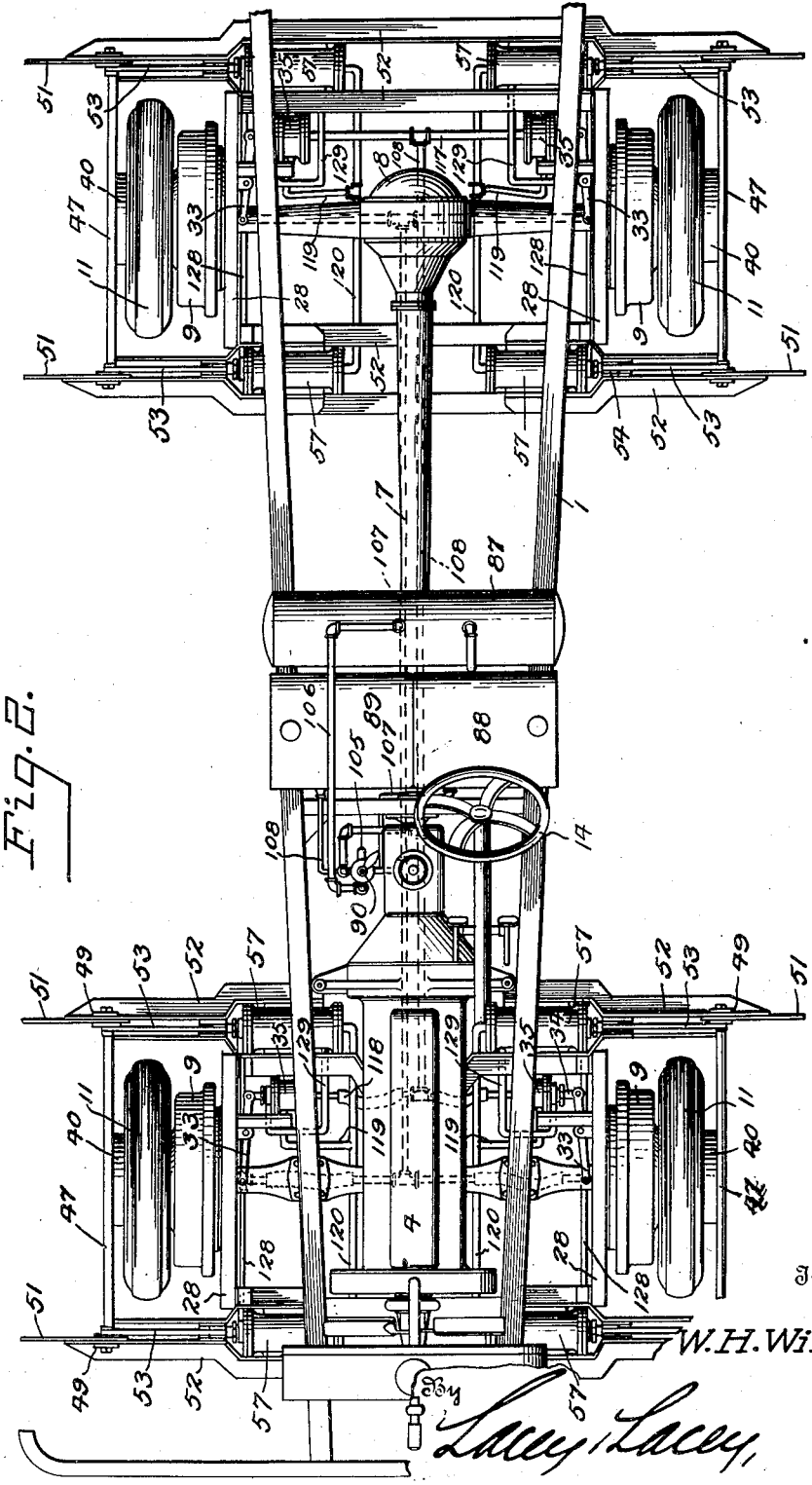

Oct. 2, 1934.  W. H. WILCOX  1,975,525
MOTOR VEHICLE
Filed Nov. 6, 1931   9 Sheets-Sheet 4
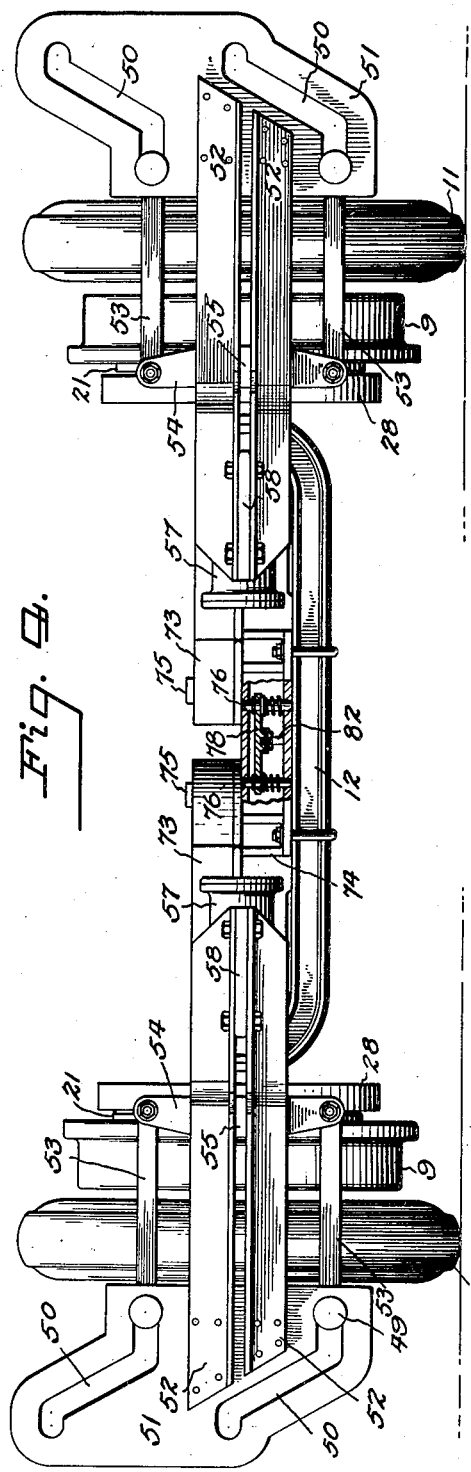
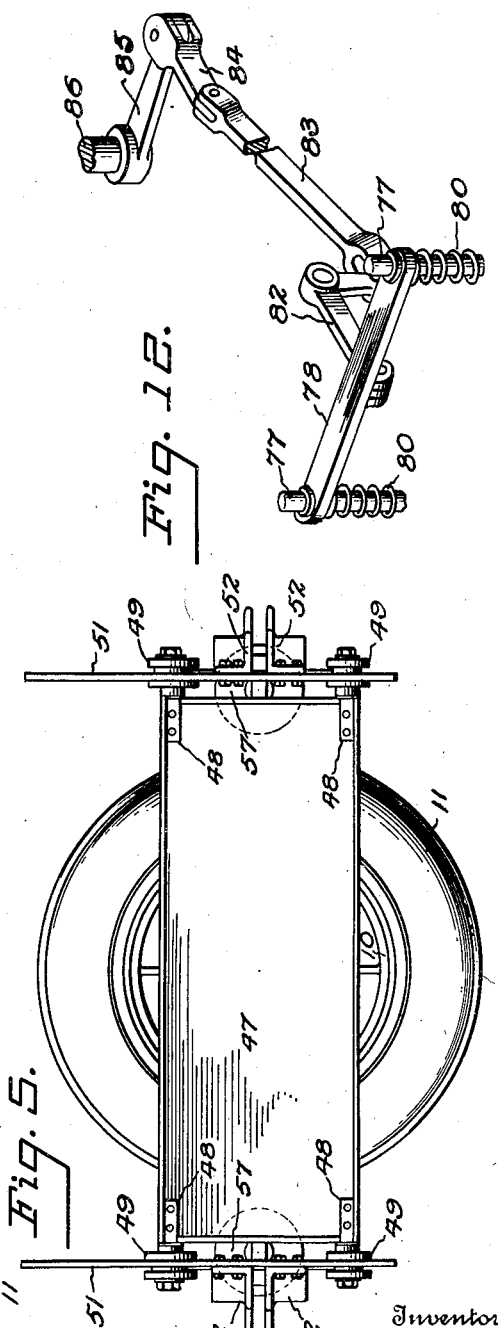
Inventor
W. H. Wilcox
By Lacey & Lacey
Attorneys Oct. 2, 1934.     W. H. WILCOX     1,975,525
MOTOR VEHICLE
Filed Nov. 6, 1931     9 Sheets—Sheet 5

Inventor
W. H. Wilcox
By Lacey & Lacey,
Attorneys

Oct. 2, 1934.   W. H. WILCOX   1,975,525
MOTOR VEHICLE
Filed Nov. 6, 1931   9 Sheets-Sheet 6
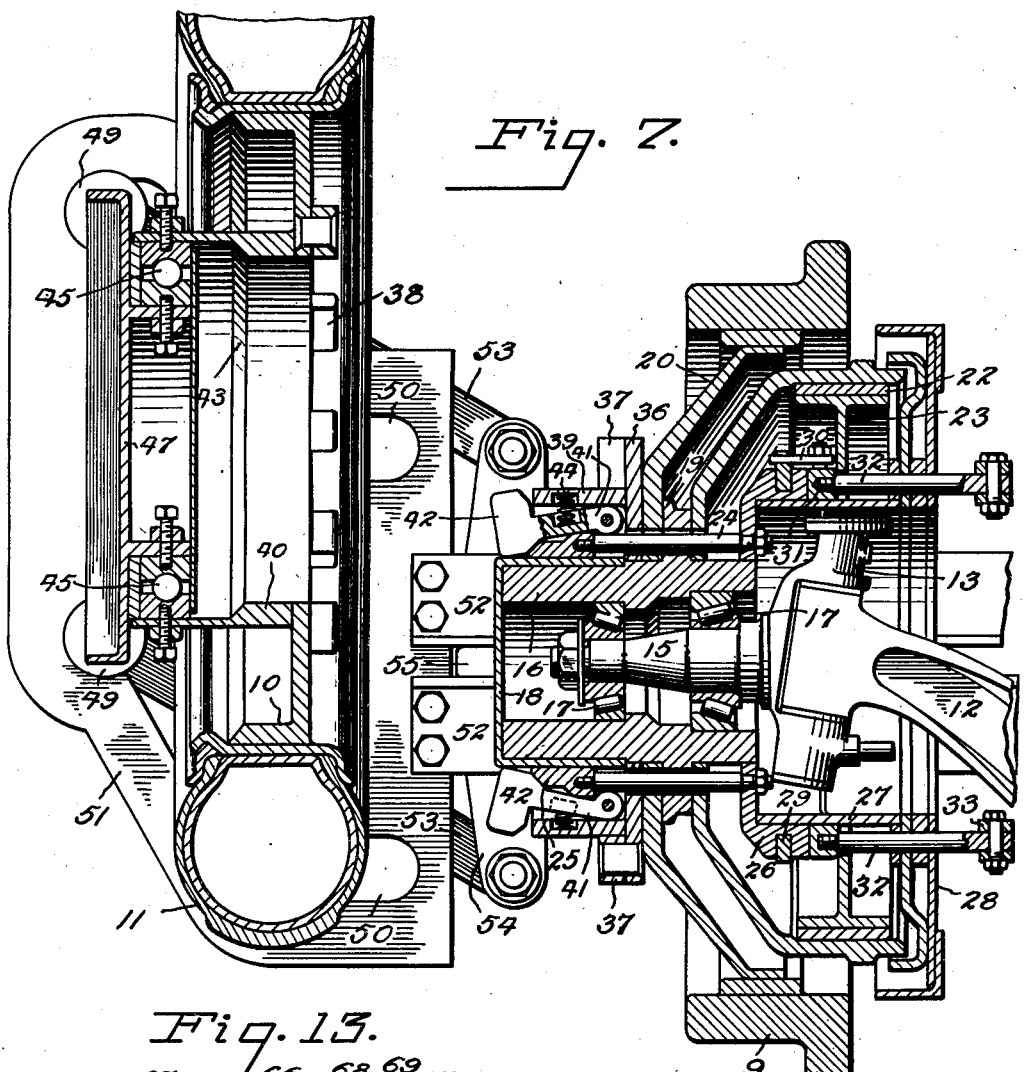

Oct. 2, 1934.   W. H. WILCOX   1,975,525
MOTOR VEHICLE
Filed Nov. 6, 1931   9 Sheets-Sheet 7
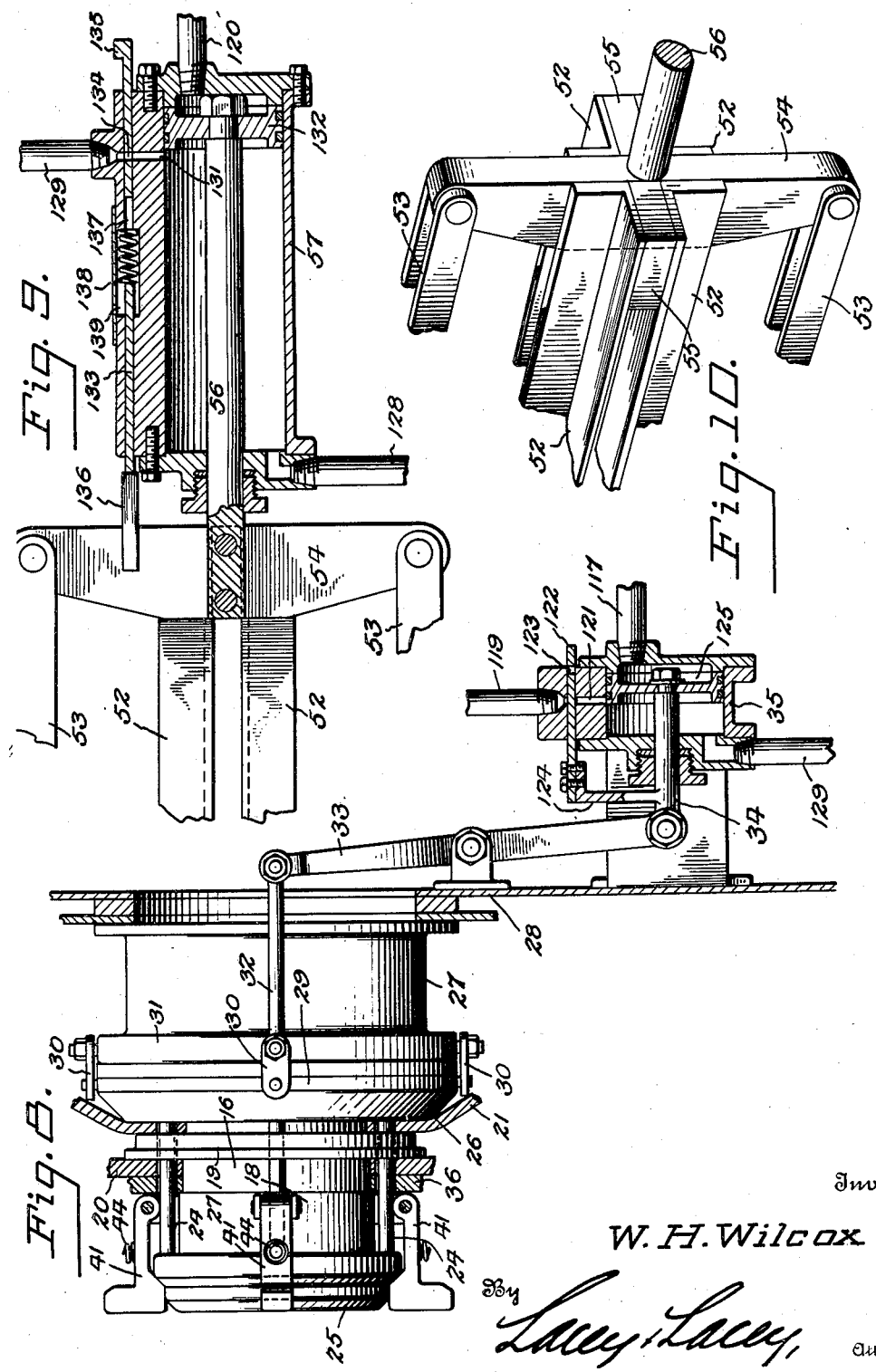
Inventor
W. H. Wilcox
By Lacey & Lacey,
Attorneys

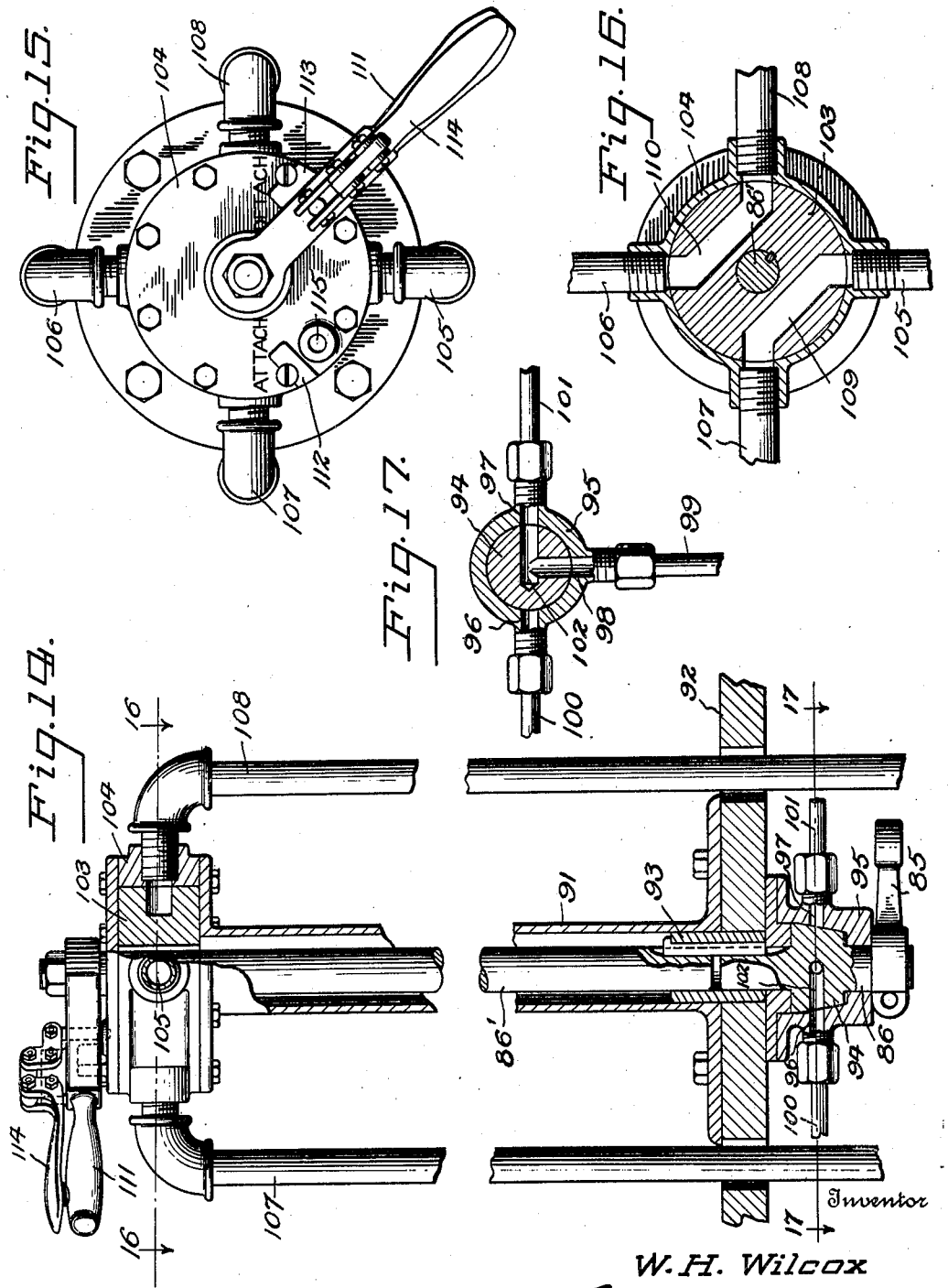

Oct. 2, 1934.  W. H. WILCOX  1,975,525
MOTOR VEHICLE
Filed Nov. 6, 1931  9 Sheets-Sheet 9
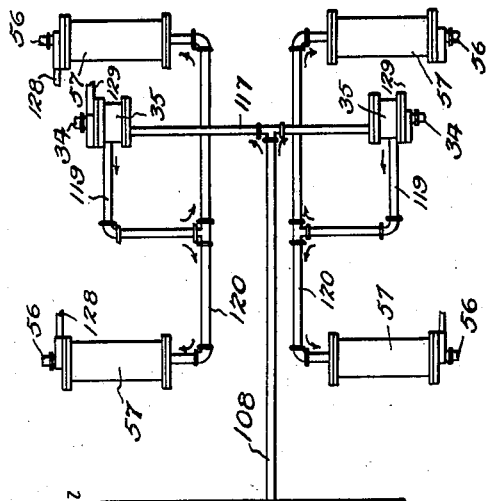
Fig.18.
Unlock and Detach Wheel
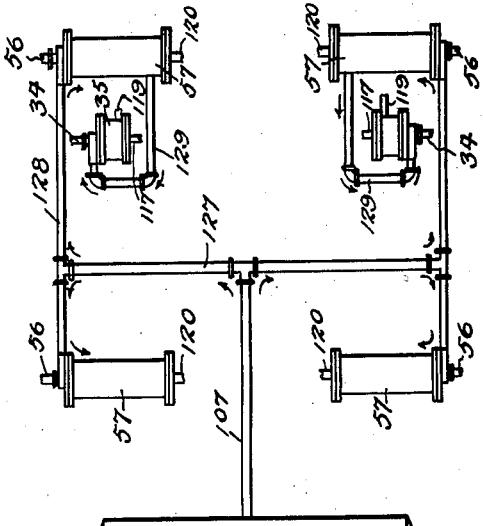
Fig.19.
Attach Wheel and Lock
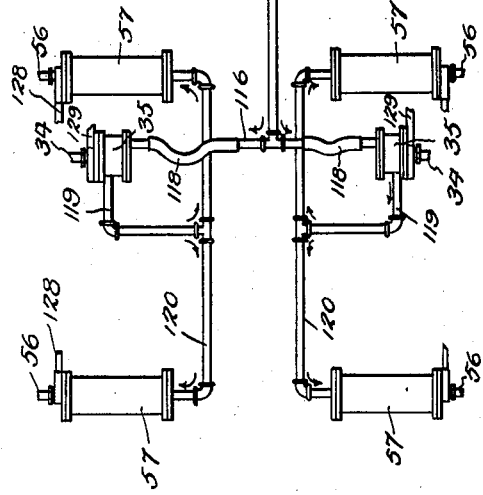
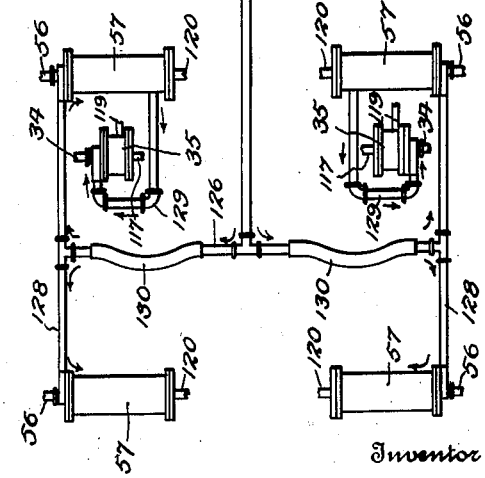
Inventor
W. H. Wilcox
By Lacey & Lacey,
Attorneys Patented Oct. 2, 1934

1,975,525

UNITED STATES PATENT OFFICE 1,975,525

MOTOR VEHICLE

William H. Wilcox, Little Rock, Ark.

Application November 6, 1931, Serial No. 573,457

27 Claims. (Cl. 105—215)

The primary object of this invention is to provide a motor-vehicle which may be driven upon a highway or upon a railroad track at the option of the operator and which may be easily arranged for use upon either form of roadbed while running and without requiring the operator to leave his position. Secondary objects are to provide a motor-vehicle with two sets of wheels, one set for use upon a highway and another set for use upon a railroad track, and means for causing the vehicle to run upon selected wheels without stopping the travel of the vehicle; to provide means whereby the operator, without leaving his seat, may project or retract the highway wheels and the wheels will be automatically locked in the set position; to provide means whereby when the vehicle is set to run upon rails the fuel line of the engine will be automatically connected with a non-taxable supply, the engine being fed from a taxed supply when the vehicle is to run upon a highway; to provide means whereby when the vehicle is to run upon a track the front track wheels will be locked in alinement and will be automatically released for steering purposes when the vehicle is again set to travel upon a highway; and to provide means whereby the highway wheels will be locked coaxially to the track wheels and will receive power through them when in use. These stated objects and other objects which will appear in the course of the following description are attained in such an apparatus as is illustrated in the accompanying drawings, and the invention consists in certain novel features which will be particularly defined in the appended claims.

Figure 8:
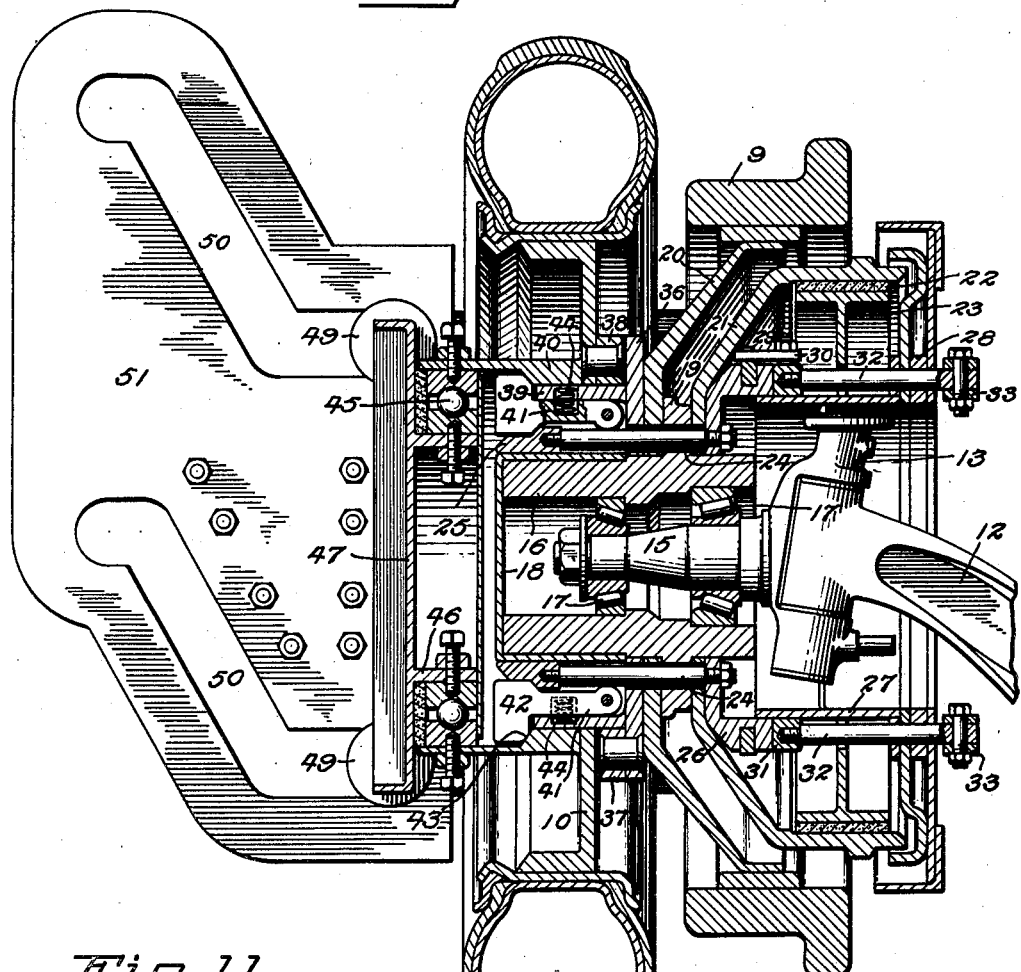
Figure 11:
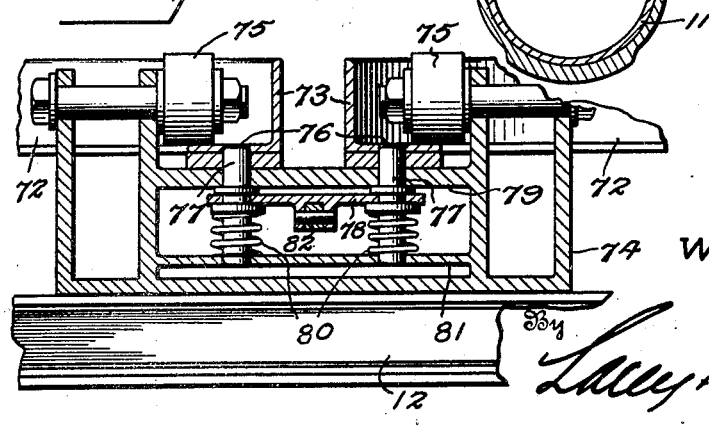

In the accompanying drawings,

Figure 1 is a side elevation, with parts broken away and parts in section, of a motor truck or freight transporting vehicle having my invention applied thereto, Fig. 2 is a top plan view of the same, with the cab and hood removed, Fig. 3 is an enlarged top plan view of the front end portion of the chassis showing the steering wheels and the parts connected with the same, Fig. 4 is a front elevation with parts in section, Fig. 5 is a side elevation of a portion of the wheel mounting, Fig. 6 is an enlarged vertical section through a pair of the front wheels showing the same in the position in which the vehicle will run upon the highway wheels, Fig. 7 is a similar view showing the highway wheel shifted to a position in which it will be clear of the roadbed and the vehicle will be permitted to run upon track rails, Fig. 8 is a view partly in top plan and partly in horizontal section of a part of the wheel-locking mechanism, Fig. 9 is a similar view of a portion of the means for shifting the highway wheel, Fig. 10 is an enlarged detail perspective view of a part of the mechanism shown in Fig. 9, Fig. 11 is an enlarged detail section of the means for locking the front wheels in alinement, Fig. 12 is a detail view of the connection between the controlling valve and the wheel-locking mechanism shown in Fig. 11, Fig. 13 is a detail section taken longitudinally of the hub of the rear wheels, Fig. 14 is an enlarged view, partly in elevation and partly in section, of the controlling valve, Fig. 15 is a top plan view of the controlling valve, Fig. 16 is a horizontal section on the line 16—16 of Fig. 14, Fig. 17 is a horizontal section on the line 17—17 of Fig. 14, Figs. 18 and 19 are diagrams illustrating the means for setting and locking the highway wheels.

While the accompanying drawings have, for convenience, shown the invention applied to a freight transporting vehicle, it is to be understood that the invention may be applied to any other vehicles and also to trailers, the trailers being connected by an air line in a manner similar to that employed in the air brake systems upon railroad trains.

In the drawings, the reference numeral 1 indicates the chassis of the vehicle, 2, the cab thereof and 3, the hood over the power plant which comprises an internal combustion engine, indicated conventionally at 4, a clutch mechanism and a system of transmission gearing of any known or approved form, the clutch casing being indicated at 5 and the transmission casing being indicated at 6. Power is transmitted from the transmission gearing through a propeller shaft to differential gearing which effects rotation of the rear wheels, said propeller shaft being housed within a casing 7 extending longitudinally of the vehicle and the differential being secured in a rear axle and differential housing, indicated at 8. All of these parts are standard and a detailed description of the same is unnecessary inasmuch as they do not form parts of the present invention.

The present invention provides two sets of wheels, one set comprising wheels 9, which are of the same general formation as railroad car wheels, and the other set of wheels comprising, according to the present illustration, disks 10 equipped with pneumatic tires 11 and adapted to run upon a highway. The wheels are arranged coaxially, with the highway wheel at the outer side of the track wheel, and the invention includes means whereby the highway wheels may be shifted close to the track wheels and locked thereto when the vehicle is to travel upon a highway and may be shifted outwardly and upwardly, clear of the track wheels, when the vehicle is to run upon a railroad track. Referring more particularly to Figs. 6 and 7, the reference numeral 12 indicates the front axle which carries steering knuckles 13 at its ends of any usual or approved construction. These steering knuckles are operated in the usual manner to effect steering of the vehicle along a highway, but the steering mechanism is omitted from the drawings as it is well known, the steering wheel 14 being indicated, however, in Fig. 2. The steering knuckles each includes a spindle 15 which is disposed within a hub 16 which may rotate about the spindle, anti-friction bearings, indicated at 17, being interposed between the spindle and the hub, as shown. The outer end of the hub is preferably covered by a cap 18 to prevent the ingress of dust or other foreign matter and the hub is provided with an annular flange 19 which fits between the web 20 of the track wheel 9 and the corresponding web 21 of the brake drum, the brake lining 22 and the brake shoe 23 being shown in the drawings, but the brake-operating mechanism being omitted in order that the elements of the invention may not be confused. The flange 19 of the hub 16 has openings therethrough, as will be noted upon reference to Figs 6 and 7, and through these openings pass bolts 24 which have their outer ends secured in a shifting ring 25 slidably fitted upon and encircling the rim of the cap 18 and having its outer edge tapered or beveled, as clearly shown. The inner ends of the bolts 24 are secured in a ring 26 which is slidably mounted upon the cylinder 27 located around the steering knuckle. This cylinder 27 is carried by a frame 28 which extends longitudinally of the chassis of the vehicle and is located at the inner side of the track wheel. The ring 26 is constructed with an external annular groove in which is fitted a collar 29, said collar 29 being connected through a series of short links 30 with a second ring or collar 31 slidably fitted upon the cylinder or drum 27 and having bolts 32 secured therein, said bolts passing inwardly through the frame 28 and being pivoted at the inner side of said frame to the forked end 33 of a lever which is fulcrumed between its ends upon the frame 28 and has its end remote from the bolts 32 pivoted to the outer end of a piston rod 34 which extends through the outer head of a cylinder 35 carried by the frame 28 and which will be hereinafter more fully described. A flange or collar 36 extends outwardly from the hub 16, immediately adjacent the web 20 of the track wheel 9, and on the outer face of this flange, at the margin thereof, are a plurality of lugs or blocks 37 arranged in a circular series, concentric with the hub 16, and adapted to mate with a series of similar lugs 38 on the inner side of the highway wheel so that, when the highway wheel is in the position shown in Fig. 6, the two series of lugs will alternate around the periphery of the flange 36 and will prevent relative rotation of the wheels so that the highway wheel will be caused to rotate with the track wheel. Bolts 24 pass through the flange 36 and through the central web 20 of the track wheel and the web 21 of the brake drum. As the track wheels and the highway wheels rotate together, application of the brakes to the track wheels will arrest the rotation of the highway wheels and stop the vehicle. At the inner ends of the several lugs 37 and 38, a rim 39 extends outwardly from the flange 36 and is fixed thereto and this rim enters the hub 40 of the highway wheel and thereby serves to properly center the highway wheel upon the track wheel. Pivotally carried by the rim 39, and extending outwardly beyond the same, are a series of dogs or latches 41, the outer ends or the heads 42 of which are radially enlarged or extended so that, at their inner edges, they will be engaged by the tapered or conical ring 25 and, at their outer edges, will be adapted to engage the rib or annular enlargement 43 of the hub 40, as clearly shown in Fig. 6, whereby the highway wheel will be locked in position upon the hub 16 and against the track wheel. When the shifting rings 26 and 31 are moved inwardly, to the position shown in Fig. 7, the ring 25 is likewise moved inwardly and the dogs 41 are then rocked radially inward, to release the hub 40, by the action of expansion springs 44 seated in sockets provided therefor in the opposed faces of the dogs and of the rim 39, as clearly shown in Figs. 6 and 7.

The auxiliary hub 40 of the highway wheel extends outwardly somewhat beyond the outer side of the wheel, as shown in Figs. 6 and 7, and is supported upon anti-friction bearings 45 which are disposed between the outer end of the hub and a rim 46 on the inner side of a frame plate 47 which constitutes an outer carrier for the highway wheel and is so mounted as to maintain the highway wheel always in parallelism with the track wheel. This frame plate 47, as shown most clearly in Fig. 5, is preferably of rectangular form and, at its corners, is equipped with brackets 48 carrying rollers 49 so constructed and arranged as to travel in slots 50 formed in guide and supporting plates 51 which are secured to the outer ends of angle bars 52 which form parts of the wheel truck. The slots 50 have lower portions which are horizontal and upper portions which are also horizontal, the two end portions being connected by an intermediate obliquely disposed portion, as clearly shown in Fig. 6, whereby the rollers 49 will be caused to travel horizontally a short distance to permit the lugs 38, on the highway wheel, to clear the lugs 37 on the flange 36 and then travel upwardly and outwardly to come to rest in the horizontally extending upper terminals of the slots, the highway wheel being thus maintained in a vertical plane at all times. The brackets 48 are pivoted to the outer ends of connecting rods 53, the inner ends of which are pivotally secured to the upper and lower ends, respectively, of cross heads 54 which are disposed between the vertical webs of the angle bars 52 to be guided thereby and are constructed with side ribs or lugs 55 disposed between the horizontal webs of the angle bars, as shown most clearly in Fig. 10, whereby the cross heads will be held against all rocking movement during their operation. The cross heads are secured to piston rods 56 which extend through the outer heads of cylinders 57 which are carried by the inner end portions of the angle bars 52 and which will be hereinafter more fully described. It may be noted at this time that the cylinders 57 are provided with side webs or flanges 58 which fit between the adjacent vertically spaced angle bars 52 and are firmly bolted to said bars. It may be also noted that one cylinder 35 is provided in association with each track wheel and the cooperating highway wheel while two of the cylinders 57 are provided in association therewith.

The description which has been given of the arrangement and mounting of the wheels has referred more particularly to the front wheels which are mounted upon steering knuckles so that they may be set in angular relation to the body of the vehicle for steering the same in the usual manner. The rear wheels differ from the front wheels merely in being mounted upon a straight axle 59 instead of being mounted upon steering knuckles and the driving shaft 60 is extended through the hollow straight axle 59 and is provided, at its outer extremity, with a head or plate 61 fast thereon and extending annularly beyond the end of the axle so that it may be firmly secured to the hub 62 which is mounted upon anti-friction bearings 63 and extends inwardly to the cylinder or drum 64 which corresponds to the drum 27 in the front wheel assembly. The hub 62 is provided with an annular flange 65, corresponding to the flange 19 in the front wheel assembly, and coupling bolts 66 extend through openings 67 in said flange and have their outer ends secured to a shifting ring which is not shown but corresponds in all essential respects to the ring 25 of the front wheel assembly. A shifting ring or collar 68 is secured to the inner ends of the bolts 66 and encircles and is slidable upon the drum 64, as will be understood upon reference to Fig. 13. The shifting ring or collar 68 is connected through links 69 and a ring 70 with an inner shifting ring 71, corresponding to the ring 31 of the front wheel assembly, the drum 64 being a part of the rear wheel frame 28 and the collar or ring 71 being carried by bolts 32 of the rear wheel assembly. It will now be understood that the front and rear wheel assemblies are the same in all respects except in those details which are necessary to accommodate the steering knuckles for the front wheels and transmit driving power to the rear track wheels, the rear highway wheels deriving motion from the rear track wheels.

The angle bars 52, which constitute the major elements of the wheel assembly frames at the rear of the vehicle, are extended entirely across the same, as shown in Fig. 2, and the frames 28 are connected by inner angle bars or beams 52, as will be readily understood. At the front of the vehicle, the inner members of each set of angle bars 52 are secured at their inner ends to frames 72 and are also secured to the frames 28, the frames 72 being disposed horizontally and having their inner ends of arcuate form, as shown clearly in Fig. 3, and provided with marginal vertical flanges or rails 73. Brackets 74 are secured upon the front axle 12, adjacent and at opposite sides of the center of the same, and in the upper ends of these brackets are mounted rollers 75 which rest upon the arcuate frame members 72, as shown in Figs. 3 and 11, so that said frame members will be held against rising. At their centers, the frame members 72 have vertical openings 76 formed therethrough and locking pins 77 are arranged to engage said openings and thereby lock the frames against movement so that, when the vehicle is to run upon a railroad track, the front wheels will be locked in alinement and the steering knuckles will be automatically rendered inoperative. The locking pins 77 are carried at the ends of a bar 78 which is disposed between the brackets 74 and below a web 79 connecting the brackets, as best shown in Fig. 11. Expansion springs 80 are mounted upon the lower portions of the pins 77 and bear at their ends against the bar 78 or shoulders on the pins and against a lower web 81 connecting the brackets 74, as shown in Fig. 11. An angle lever 82 is pivoted at one end to the bar 78, at the center thereof, and, at its opposite end, is pivoted to a link 83, as shown in Fig. 12, it being noted, upon reference to Fig. 1, that the angle lever 82 is pivoted at its angle upon a web which connects the brackets 74. The link 83 extends upwardly and rearwardly from the angle lever 82 and, at its upper rear end, is pivoted to a shorter link 84 which is carried by a crank 85 at the lower end of a stem 86 which constitutes the lower terminal of the controlling valve.

The pistons in the several cylinders 35 and 57 are to be operated, in the arrangement illustrated, by compressed air which is fed to the cylinders from a reservoir or tank 87 which may be connected with an air compressor, (not shown) driven by the motor 4, and may be located at any convenient point upon the vehicle chassis, being illustrated, in Fig. 1, as disposed below the driver's seat. It should be understood, however, that the pistons may be operated hydraulically by the employment of a liquid, such as heavy oil, and the use of a hydraulic medium will not necessitate any change in the operating elements except that, instead of being exhausted into the atmosphere, the fluid would be returned to the reservoir after going through a cycle of operation. While many of the States impose a tax upon fuel which is used to drive vehicles over the roads and highways of the State, the vehicles traveling upon rail tracks do not use the highways and, consequently, the reason for levying a fuel tax disappears. I, therefore, provide two tanks or containers for fuel which are shown disposed under the operator's seat and one of these tanks 88 will be automatically placed in communication with the motor when the vehicle is to travel over a highway while the other tank 89 will be in communication with the motor only when the vehicle is to travel upon a railroad track. The tanks will, of course, be equipped with oil seals or other media which may be needed to comply with the laws of the several States so that the non-taxable fuel will not be used when the taxable fuel should be used, and vice versa. The adjustment of the vehicle to a highway or a railroad track is accomplished by manipulation of a controlling valve 90 which is mounted within convenient reach of the operator. This controlling valve includes the stem 86' which is disposed within a vertical casing 91, secured upon the floor 92 of the vehicle, and has a bushing 93 keyed to its lower end so that it will be spaced from the casing and maintained in concentric relation thereto without excessive wear. The bushing, as shown in Figure 14, is also keyed to the upper end of a valve body 94 which is rotatably fitted within a casing 95 secured upon the underside of the floor 92. The casing 95 is provided with diametrically opposite ports 96 and 97 and an intermediate port 98, the port 98 being connected through a pipe 99 with the carbureter and intake manifold of the motor, while the ports 96 and 97 communicate through pipes 100 and 101, respectively, with the separate fuel tanks 88 and 89. The valve body 94 has a passage 102 formed therein, the terminals of this passage being at a right angle to each other so that the valve body may be set to establish communication between the port 98 and either of the ports 96 or 97, as will be understood upon reference to Fig. 17. The ports are so disposed that, when the controlling valve is set to effect shifting of the highway wheels to their upper outer positions, clear of the track wheels, the port 97 will be in communication with the port 98 and, consequently, the motor will use fuel from the non-taxable supply and, when the highway wheels are lowered and locked to the track wheels, the port 96 will be in communication with the port 98 and the port 97 will be closed, the motor then getting its supply from the taxed fuel.

At the upper end of the valve stem 86, there is secured a valve body 103 disposed within a circular casing 104 provided with a plurality of ports spaced circumferentially about the same. One of the ports has the end of an exhaust pipe 105 secured therein so that, when this port is open, the air from one side of the several pistons will be permitted to exhaust into the atmosphere below the vehicle while the diametrically opposite port receives the end of a supply pipe 106 connected with the reservoir 87. Between the mentioned ports are other diametrically opposite ports, one of which receives the end of a pipe 107 and the other receives the end of a pipe 108, the pipe 107 being connected with the outer ends of the cylinders 57 while the pipe 108 is connected with the inner ends of the cylinders 35. The valve body 103 has passages 109 and 110 formed therethrough and said passages are disposed at opposite sides of the center of the valve body and so arranged that in one position of the valve body, the passage 109 will connect the pipe 107 with the exhaust pipe 105 and the passage 110 will connect the pipe 108 with the pipe 106 leading from the reservoir and, in another position, the passage 110 will connect the pipe 108 with the exhaust and the passage 109 will connect the pipe 107 with the supply pipe 106 leading from the reservoir. The valve body is keyed to the stem 86 so as to turn therewith and, at the upper extremity of the stem, above the casing 104, a handle 111 is secured to the stem. Suitably located lugs 112 and 113 limit the movement of the handle so that it can move only between the two positions which determine the adjustment of the highway wheel, and a latch mechanism 114 is provided, upon the handle, to engage sockets 115 in the top of the casing 104 so that the handle will be locked in either of its extreme positions.

For convenience, and to facilitate an understanding of the operation, I have illustrated the piping whereby the operating fluid is conveyed to the several cylinders in two diagrams, Figs. 18 and 19, but it must be understood that each of these figures illustrate only a part of the apparatus and that the two figures together show the entire mechanism. Referring to Fig. 18, it will be noted that the pipe 108 has its main portion extending longitudinally of the vehicle chassis and disposed substantially centrally thereof, the ends of the said pipe being coupled into transverse pipes 116 and 117, respectively, which lead to the inner ends or heads of the respective cylinders 35, the pipe 116 at the front of the vehicle having flexible intermediate portions, indicated at 118, so as to accommodate the relative movements of the wheels when the vehicle is being steered along a highway. Pipes 119 lead from the sides of the several cylinders 35, near their outer heads, and these pipes 119 communicate through pipes 120 with the inner ends of the adjacent cylinders 57. Upon referring to Fig. 8, it will be noted that a port 121 leads through the wall of the cylinder 35 to the end of the pipe 119 and across this port extends a slide valve 122 having an opening 123 therethrough, said valve being secured to an arm 124 projecting from the piston rod 34 so that the valve follows the movements of the piston rod and the piston 125. When the highway wheel is in use, the parts will be in the position illustrated in Fig. 8, the piston 125 being at the inner end of the cylinder 35 and closing the port 121. The slide valve 122 also extends across the port 121 and flow of air through the pipe 119 is, consequently, cut off. When air is admitted to the cylinder 35, through the pipe 117, the piston 125 is moved to the outer end of the cylinder and uncovers the port 121, the valve 122 being simultaneously carried outwardly so that the opening 123 therein will aline with the port 121 and the air may then flow through the pipe 119 to the inner ends of the several cylinders 57.

Upon reference to Fig. 19, it will be seen that the pipe 107 is disposed in the same manner as the pipe 108, Figs. 2 and 3 showing that these pipes are disposed alongside each other. The pipe 107 communicates, at its ends, with cross pipes 126 and 127 which, in turn, are connected to longitudinally extending pipes 128 which lead to the outer ends of the several cylinders 57, and from the side of that cylinder 57 which is adjacent the cylinder 35 and near the inner end of said cylinder 57, a pipe 129 leads to the outer end of said cylinder 35. The pipe 126 has flexible portions 130, corresponding to the flexible portions 118 of the pipe 116 and for the same purpose.

Upon referring to Fig. 9 it will be noted that a port 131 leads through the side of the cylinder 57 to the end of the pipe 129 and the piston 132, within the cylinder 57, uncovers said port 131 when the piston is at the inner end of the cylinder. A slide valve 133 is mounted in the side wall of the cylinder 57 and has an opening 134 therein which alines with the port 131 when the parts are in the position shown in Fig. 9. The slide valve 133 is formed with a stop shoulder 135 at one end adapted to impinge against the end of the cylinder and thereby limit the outward movement of the slide while the opposite end of the slide is disposed to bear against a projection 136 on the cross head 54. Between its ends, a slot 137 is formed in the slide 133 and an expansion spring 138 is disposed within said slot and accommodated within a recess 139 formed in the wall of the cylinder. When the piston 132 moves outwardly, the projection 136 moves away from the slide which then follows the movement by reason of the expansion of the spring 138 and the port 131 is thereby cut off. The stop 135 limits the movement of the slide so that it will move only to such an extent as is necessary to cut off the port 131 and, upon return movement, the projection 136 will eventually impinge against the slide and restore it to the position in which the port will be open, the movement of the slide being arrested when the piston is in the position shown in Figure 9.

It will be assumed that the wheels are in the position shown in Fig. 6 and the operator is driving his car along a highway. Upon approaching a railroad over which he desires to continue his journey, the car is driven onto the railroad crossing and steered into the position in which the track wheels will be alined with the track rails. As the vehicle leaves the crossing, the track wheels pass onto the track rails and the load is automatically shifted from the highway wheels to the track wheels which are of less diameter than the highway wheels but are so proportioned that the highway wheels will be suspended out of contact with the ties or the roadbed. Without slackening his speed, the operator shifts the controlling valve so that air from the reservoir will be sent through the pipe 108 to the inner ends of the several cylinders 35, the front wheels being automatically locked in alinement by the mechanism which has been described when they rest upon the track rails. When air is thus sent into the cylinders 35, through the inner ends or heads of the same, the pistons 125 are shifted to the outer ends of the respective cylinders and the forked levers 33 are thereby rocked so that the rings 26 are moved inwardly and the tapered seating ring 25 is drawn toward the pivotal ends of the several dogs 41 which are then rocked, as described, to release the highway wheels. The outward movement of the pistons 125 uncovers the ports 121 and the air then flows through the pipes 119 and 120 to the inner ends of the several cylinders 57 so that the pistons 132 therein are forced outwardly. This outward movement of the pistons 132 is transmitted to the cross heads 54 and from the cross heads through the links 53 to the frame plates 47 which carry the respective highway wheels. Said plates 47 and the highway wheels are, consequently, shifted to the outer raised position shown in Fig. 7. The air is not cut off at this time and the pressure of the same will maintain the highway wheels in the raised inoperative position, clear of normal obstructions on the roadbed. When it is desired to resume travel upon the highway, the operator will reduce his speed somewhat so as to avoid clashing between the lugs 37 and 38 as the highway wheels resume their position in locked engagement with the track wheels. The controlling valve is then set so that the air from the cylinders 35 may exhaust and air will be admitted through the pipe 107 and its connections to the outer ends of the several cylinders 57 so that the pistons 132 in the latter cylinders will be caused to travel inwardly thereby exerting a pull upon the cross heads 54 and through the links 53 to bring the highway wheels down to their operative positions, the valves 133 establishing the flow through the pipes 129 at the proper instant so as to hold the pistons 132 at the inner ends of their respective cylinders. As the highway wheels again center themselves upon the hubs 16, the ribs 40 will be brought into position to be engaged by the heads of the dogs 41. When the air enters the cylinders 35 from the pipes 129, the pistons 125 will be driven inwardly and the forked levers 33 will then be rocked so as to shift the several rings outwardly and lock the dogs 41 in engagement with the hubs of the highway wheels, as shown in Figure 6. When the vehicle reaches the point where the platform or other surface is built up flush with the track rails, the highway wheels will ride onto said surface and will thereby lift the track wheels from the track rails, it being noted that the extreme outside diameter of the highway wheels is greater than the extreme outside diameter of the track wheels.

From the foregoing description, taken in connection with the accompanying drawings, it will be seen that I have provided a very simple and easily controlled mechanism whereby a motor driven vehicle may be shifted to travel upon a railroad track or upon a highway, as may be desired. The bearings and axles may be of any standard equipment and the motor, the gear-shifting elements, the steering mechanism and brake-operating mechanism may all be standard equipment so that it is not necessary to confine my invention to newly built vehicles, nor to dismantle any existing vehicle to embody my invention therein.

Having thus described the invention, I claim,

1. A vehicle provided with track wheels for running upon a railroad track, highway wheels for running upon a highway, means for locking the highway wheels to the track wheels, means for releasing the highway wheels and shifting them to a position clear of the roadbed and maintaining them in the clear position, and means whereby as the highway wheels are shifted to the position clear of the roadbed the track wheels will be locked in alinement.

2. A motor vehicle provided with track wheels for running upon a railroad track, highway wheels for running upon a highway, means normally locking the highway wheels to the track wheels, means for releasing the highway wheels and shifting them to and supporting them in a position clear of the roadbed, a plurality of fuel containers, and means whereby, when the vehicle is running upon the track wheels, the motor will be connected with one fuel container and, when the vehicle is running upon the highway wheels, the motor will be connected to the other fuel container.

3. A vehicle provided with track wheels for running upon a railroad track, highway wheels for running upon a highway, means whereby the highway wheels will be normally locked to the track wheels, means for shifting the highway wheels to a position clear of the track wheels and the roadbed, the track wheels being mounted to assume various angular positions in steering the vehicle, frames movable with the track wheels in steering the vehicle and extending inwardly therefrom and provided with arcuate inner sides, the arcuate inner sides being provided with locking elements, locking pins engageable in said elements, and means whereby, when the highway wheels are shifted clear of the track wheels and the roadbed, the locking pins will be released to engage said locking elements.

4. A motor vehicle having track wheels for running upon a railroad track, highway wheels for running upon a highway, frames movable to vary the angular position of the track wheels in steering the vehicle, said frames extending inwardly and having terminal portions disposed transversely of the vehicle, locking pins disposed below said frames and yieldably held in engagement therewith whereby to maintain the track wheels in alinement, means whereby the highway wheels will be normally locked to the track wheels, means for shifting the highway wheels into or out of operative relation to the track wheels, and means whereby, when the highway wheels are shifted into operative position, the locking pins will be released to permit steering manipulation of the track wheels.

5. A motor vehicle having track wheels to run upon a railroad track, highway wheels to run upon a highway, means whereby the highway wheels will be normally locked to the track wheels to turn therewith, means for releasing the highway wheels and shifting them to an inoperative position, frames movable with the track wheels in steering the vehicle, locking pins mounted below said frames and yieldably engaging the same to hold the track wheels in alinement, a cross bar connecting said locking pins, an angle lever mounted upon the vehicle and connected at one end to said cross bar, a controlling device for operating the means for shifting the highway wheel, and connections between said controlling device and said angle lever.

6. A vehicle having track wheels adapted to run upon a railroad track, hubs to which the track wheels are connected to rotate therewith, highway wheels adapted to be mounted upon said hubs at the outer sides of the track wheels, interengaging lugs on the track wheels and the highway wheels whereby the highway wheels will be caused to rotate with the track wheels, the highway wheels having auxiliary hubs to encircle the first-mentioned hubs, dogs between the two hubs for locking the highway wheels to the track wheels, and means operating between the hubs for setting or releasing said dogs.

7. A vehicle provided with track wheels for running upon a railroad track, hubs upon which the track wheels are mounted to rotate therewith, highway wheels having auxiliary hubs adapted to fit around the first-mentioned hubs, dogs carried by the first-mentioned hubs and adapted to engage the hubs of the respective highway wheels to hold the latter to the track wheels, shifting rings slidably fitted upon the first-mentioned hubs to maintain the dogs in engagement with the hubs of the highway wheels, and means whereby the rotation of the track wheels will be imparted to the highway wheels.

8. A vehicle provided with track wheels for running upon the rails of a railroad track, hubs upon which the track wheels are mounted to rotate therewith, highway wheels provided with auxiliary hubs to encircle the first-mentioned hubs in spaced relation thereto, dogs mounted upon the first-mentioned hubs to engage the hubs of the respective highway wheels, shifting rings mounted upon the first-mentioned hubs for engaging the inner edges of the several dogs whereby to hold them normally outward in engagement with the hubs of the highway wheels, other shifting rings mounted at the inner sides of the track wheels, coupling bolts connecting the shifting rings and locking the track wheels to the first-mentioned hubs, and means at the inner sides of the track wheels, operable from the vehicle, for shifting the rings and coupling bolts to release or set the dogs.

9. In a vehicle, the combination of axles, supporting frames mounted at opposite sides of the axles and parallel therewith, track wheels supported from the axles for running upon the rails of a railroad track, highway wheels for running upon a highway, means for locking the highway wheels to the track wheels for rotation therewith, guide plates extending from the supporting frames, frame plates disposed between the coacting guide plates and engaged therewith, means whereby the highway wheels will be carried by said frame plates and supported thereon, and means for shifting said frame plates along the guide plates simultaneously with the releasing of the means for locking the highway wheels to the track wheels.

10. A vehicle provided with wheels to run upon a railroad track, wheels to run upon a highway, and fluid-pressure means for shifting the highway wheels into and out of operative relation to the track wheels and maintaining them in the set position.

11. A vehicle provided with track wheels to run upon a railroad track, wheels to run upon a highway and adapted to be locked to the track wheels to rotate therewith, fluid-pressure means for releasing the highway wheels from the track wheels, and coordinated means for shifting the highway wheels clear of the track wheels and maintaining the highway wheels in the clear position.

12. A vehicle provided with track wheels, highway wheels, means for locking the highway wheels to the track wheels, fluid-pressure means for operating said locking means, fluid-pressure means for shifting the highway wheels into or out of operative relation to the track wheels, the several fluid-pressure means being in communication for effecting circulation of pressure fluid, and valves responsive to the movement of the fluid-pressure means to control the circulation.

13. A motor-vehicle provided with track wheels, highway wheels, a plurality of fuel containers, and means controlled by a single unit for shifting the highway wheels to or from the track wheels, locking the highway wheels to the track wheels, locking the wheels in alinement when the vehicle is to run on the track wheels, and selectively connecting the vehicle motor with the respective fuel containers.

14. A vehicle provided with track wheels for running upon a railroad track, highway wheels for running upon a highway, interengaging projections on the wheels whereby the highway wheels will be caused to rotate with the track wheels, a dog adapted to clutch the wheels together, and fluid pressure means for operating the dog and shifting the highway wheels to and from the track wheels.

15. A vehicle provided with track wheels, highway wheels, hubs to which the track wheels are connected to rotate therewith, hubs on the highway wheels to fit around the first-mentioned hubs, dogs mounted on the first-mentioned hubs to engage the hubs on the highway wheels and hold the highway wheels in operative position, and means to release the dogs and simultaneously shift the highway wheels to inoperative position.

16. A vehicle provided with track wheels, inner hubs to which the track wheels are connected, highway wheels having hubs to encircle the inner hubs, dogs pivoted upon said inner hubs, yieldable means acting on said dogs to hold their free ends from the hubs on the highway wheels, and means slidably mounted on the inner hubs and engaging the dogs to shift the dogs into engagement with the hubs on the highway wheels whereby to hold the highway wheels in operative position.

17. A vehicle provided with track wheels, highway wheels, interengaging means on said wheels whereby the highway wheels will be caused to rotate with the track wheels, members carrying the highway wheels, and fluid pressure operated means for shifting and setting said members laterally whereby the highway wheels will be moved into and out of engagement with the track wheels and maintained in each adjusted position.

18. A vehicle provided with track wheels, highway wheels, members carrying the highway wheels, guides extending upwardly and laterally with respect to the wheels and with which said carrying members are engaged, and means for shifting said members along said guides whereby the highway wheels will be moved into or out of operative position.

19. A vehicle provided with track wheels, highway wheels, members carrying the highway wheels, guides extending upwardly and laterally with respect to the wheels and with which said carrying members are engaged, cross heads located between corresponding wheels transversely of the vehicle and connected to said carrying members, and means for actuating the crossheads whereby the carrying members will be shifted along said guides to carry the highway wheels into or out of operative position.

20. A vehicle having track wheels, highway wheels, members carrying the highway wheels, means for holding the highway wheels in operative position, devices for setting said holding means, a plurality of cylinders, pistons in some cylinders operatively connected with said setting devices, pistons in other cylinders operatively connected with the members carrying the highway wheels, ports in the sides of the cylinders, valves controlling said ports and connected with the respective pistons, pipes leading from said ports to ends of cooperating cylinders to establish communication between cooperating cylinders, means for supplying pressure fluid to all the cylinders, and a single means for controlling the circulation of the pressure fluid.

21. A vehicle with wheels to operate upon a highway, track wheels for operating upon a railroad track, fluid pressure means for shifting the relative position of the wheels for operation of the vehicle upon the highway or the railroad track, and guides for directing the highway wheels obliquely laterally toward and away from the track wheels under influence of said fluid pressure shifting means.

22. A motor vehicle provided with wheels to operate upon a highway, track wheels for operation upon a railroad track, means for shifting the wheels into or out of operative position, a plurality of fuel containers, and means whereby when the vehicle is running upon the railroad track the vehicle motor will receive fuel from one fuel container and when the vehicle is running upon the highway the motor will receive fuel from another container.

23. A vehicle provided with track wheels to operate upon a railroad track, wheels adapted to be disposed coaxial with the track wheels to operate upon a highway, and fluid pressure means for engaging and disengaging the track and highway wheels whereby to adapt the vehicle for travel upon railroad or highway.

24. A vehicle provided with wheels adapted to run upon a railroad track, wheels adapted to run upon a highway and disposed normally coaxial with and outside of the track wheels, and fluid pressure operated means for shifting the highway wheels clear of the track wheels and maintaining them in shifted position to permit the track wheels to operate upon the track.

25. A vehicle provided with track wheels for running upon a railroad track, highway wheels for running upon a highway normally disposed coaxial with and outside of the track wheels, means for locking the highway wheels to the track wheels, and fluid pressure means for releasing the locking means and shifting the highway wheels to a position above the coaxial and clear of the roadbed.

26. A vehicle provided with a set of wheels to run upon a railroad track, a set of wheels to run upon a highway, fluid pressure operated means for shifting one set of wheels into or out of coaxial relation with the other set of wheels, and fluid pressure operated means for maintaining the wheels set in each shifted position.

27. A vehicle provided with wheels to run upon a railroad track, wheels to run upon a highway, fluid pressure means for shifting the highway wheels into and out of operative relation to the track wheels and maintaining them in set position, a member carrying the highway wheels, and guides for directing the member through a substantially oblique path under influence of said fluid pressure means for shifting the highway wheels to a position clear of the roadbed.

WILLIAM H. WILCOX. [L. S.]